United States Patent [19]

Warner et al.

[11] Patent Number: 5,426,985
[45] Date of Patent: Jun. 27, 1995

[54] MULTIRANGE ADJUSTABLE FLOW CONTROL

[75] Inventors: Dale J. Warner; Dale J. Warner, both of Palm Harbor, Fla.

[73] Assignee: A.W Chesterton Co., Stoneham, Mass.

[21] Appl. No.: 114,058

[22] Filed: Aug. 31, 1993

[51] Int. Cl.6 ................................. G01F 1/22
[52] U.S. Cl. ..................... 73/861.47; 73/861.62
[58] Field of Search .......... 73/861.52, 861.53, 861.54, 73/861.55, 861.61, 861.62, 716, 744, 861.47, 861.48; 251/207

[56] References Cited

U.S. PATENT DOCUMENTS

| | | | |
|---|---|---|---|
| 932,960 | 4/1909 | Cappon | 251/207 |
| 1,456,621 | 5/1923 | Chadwick | 73/861.62 |
| 2,101,356 | 12/1937 | Zak | 251/207 |
| 2,277,760 | 3/1942 | Hoffman et al. | 73/861.60 |
| 2,286,188 | 6/1942 | MacLean | 73/716 X |
| 3,034,357 | 5/1962 | Brown | 73/744 |
| 3,232,107 | 2/1966 | Busillo | 73/861.55 |
| 3,304,779 | 2/1967 | Reed | 73/861.47 |
| 3,321,970 | 5/1967 | Walker, Sr. et al. | 73/861.62 |
| 3,450,164 | 6/1969 | Walker, Jr. | 73/861.62 X |
| 4,434,670 | 3/1984 | Rosaen | 73/861.34 |

*Primary Examiner*—Herbert Goldstein
*Attorney, Agent, or Firm*—Hill, Steadman & Simpson

[57] ABSTRACT

A flush fluid flow control apparatus having an adjustable flow control valve and a flow measuring orifice combined in a block assembly. The flow control orifice is formed in a tube having a plurality of radial orifices and which can be axially turned to register with the flow channel for selecting flow ranges measurable by the orifice selected. Differential pressure is read across the orifice and communicated to act on a double headed piston which moves through the block proportionally to the differential pressure, the double headed piston compressing air in a chamber to an extent proportional with its movement, and a pressure gauge is installed into the chamber to correlate the movement of the double headed piston with the actual flow rate.

9 Claims, 3 Drawing Sheets

MULTIRANGE ADJUSTABLE FLOW CONTROL

BACKGROUND OF THE INVENTION

The present invention relates to seals or packing which utilize a barrier or flush fluid. Particularly, the invention relates to a flush fluid control valve which incorporates a flow meter for accurate flush flow rate into a packed gland or a mechanical seal.

Clean flush injection is used to extend the life of mechanical seals or packing in many applications. Packed pumps or pumps with mechanical seals often have clean flush water injection through a lantern ring port on the pump casing. The flush water serves several purposes: to lubricate packings and seals on pumps that frequently break prime or run dry or where the working fluid has poor lubricating properties; to prevent premature packing or seal failure due to abrasive particles in the working fluid; and/or to ensure that leakage from the packing or seal to the external environment will be an innocuous liquid, e.g. water.

While continuous injection of clean flush water is required for long seal life, the actual flow rate needed is low. However, in the past, it has been difficult to maintain flow rates in the required ranges. Column flow gauges can be provided, and while inexpensive, quickly become occluded with pipe scale.

Additionally, maintenance personnel, aware of the need to flush seals, often resort to the use of excess flush water to avoid unscheduled downtime. Modern environmental laws and conservation efforts demand improved monitoring and control to minimize water consumption in these systems.

SUMMARY OF THE INVENTION

The present invention provides an apparatus which injects a precise amount of clean flush fluid such as water into packed glands or mechanical seals. The apparatus is constructed for long life even under adverse industrial conditions. The apparatus includes a flow control valve, a multi-orifice flow meter, a meter range selector, and a dial gauge with two scales covering a low flow rate range and a high flow rate range. The dial gauge is easy to read and will not become fogged or occluded over time. The unit is also designed to be easily cleaned. Dirt or pipe scale can be flushed from the unit without disconnecting the feed lines.

The dial gauge indicates the flow rate. The rates are measured by a pressure drop across a calibrated orifice selected from the multi-orifice flow meter. A differential pressure transducer is provided which translates this orifice pressure drop into a flow rate on the dial gauge. Since a pressure drop is normally required between the line feed and the pump, the additional pressure drop is not a detriment.

According to the invention, the control valve adjusts the injection flow rate of flush water. The valve can be adjusted clockwise to reduce the flow rate through the system. An opposite turning of the valve increases the flow through the system. The control valve allows fine adjustments at the lower flow rates required. The valve is also designed to be clog resistant and is easily cleaned. The meter range selector sets the unit to operate in one of two ranges. The range selector knob is coded for a low range, typically 15–35 GPH; and a high range typically 30–70 GPH.

The present invention provides a rugged, compact and versatile flow control valve and flow meter assembly. The flow control valve and the multi-orifice flow meter are housed in a unitary block with adjustment knobs extending outwardly thereof. The flow meter provided an open ended flow tube having angularly spaced apart radial bores corresponding to the orifice to be selected based on anticipated flow range.

A double headed piston housed reciprocally within the block, and, enclosed by upper and lower covers, acts as the differential pressure transducer by converting a differential pressure signal into a pressure signal to be read by the dial gauge, i.e., a pressure gauge calibrated to indicate flow rates.

DETAILED DESCRIPTION OF THE PREFERRED EMBODIMENTS

Figure 1:
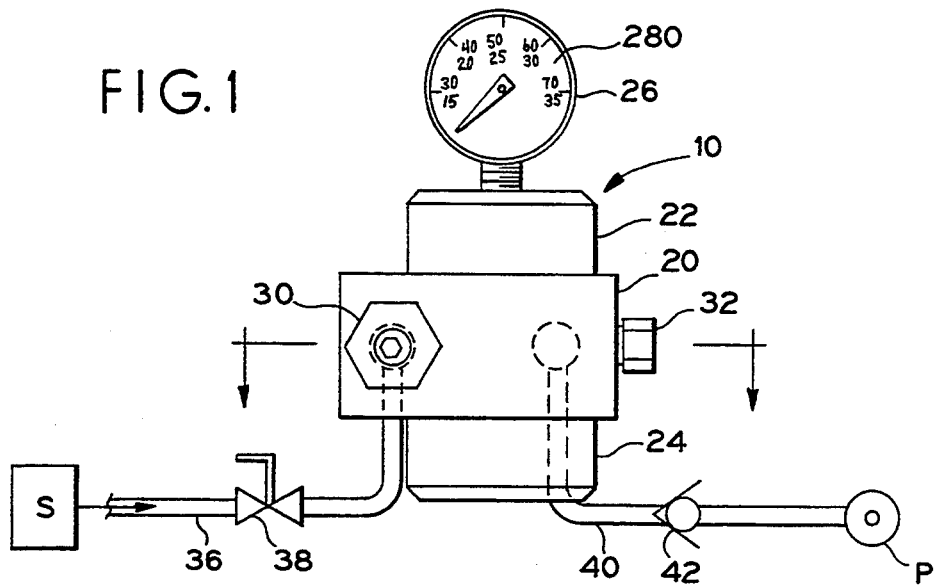
FIG. 1 is an elevational view of the apparatus of the present invention.

FIG. 1 illustrates the flush apparatus 10 of the present invention generally. The apparatus comprises a body 20 disposed between a top cover 22 and a bottom cover 24. The top cover 22 has a dial gauge 26 screwed thereinto. A control valve 30 and a range control 32 are screwed into the body. A supply $\bar{S}$ of flush fluid flows through a pipe 36 through a shut off valve 38 and into the body 20. An outlet pipe 40 is connected to the body 20 and delivers fluid through a check valve 42 and into the seal or packing $\bar{P}$.

Figure 2:
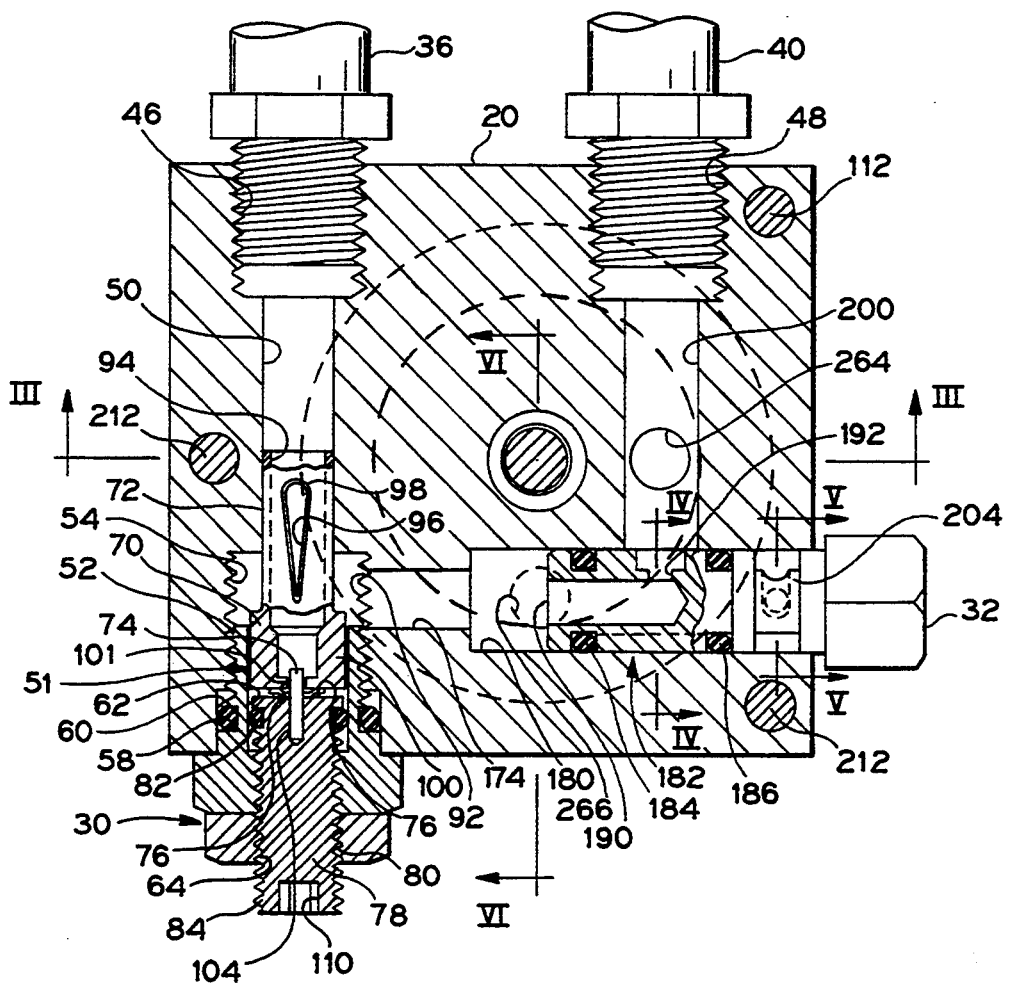
FIG. 2 is a sectional view taken generally along line II—II of FIG. 1.

FIG. 2 illustrates the pipe 36 screwed into an inlet 46 of the body 20. The pipe 40 is screwed into an outlet 48 of the body 20. The inlet 46 is in flow communication with a inlet channel 50 which opens into a flow control valve 30.

The flow control valve 30 comprises a bushing 51 having male threads 52 engaged to female threads 54 within a bore 60 of the body 20. An O-ring 58 is provided between the bushing 51 and a bore 60 of the body 20 to seal the bushing 51 to the body 20. The bushing provides an internal channel 62 open to the bore 60. Axially arranged within the bore 60 and the channel 62 is a valve element 70. The valve element 70 comprises a valve body 72, a pin 74, a wave spring 76, a valve adjuster 78 with surrounding male threads 80, and a secondary O-ring 82. A lock nut 84 is threadingly engaged around the male threads 80 of the valve adjuster 78 and locks the adjuster to the bushing.

The valve body 72 tightly innerfits within the channel 50 which is open to the stepped bore 60. The valve body 72 extends from the channel 50 an adjustable distance into an annular channel 92 formed by the bore 60. The valve body has an open end 94 flow communicating with the channel 50 and an elongate tapered orifice 96. The elongate orifice 96 is tapered to have its widest clearance 98 at a trailing end of the valve body 72 with respect to the direction of flow. The orifice 96 has a tapered profile which allows fine tuning adjustment of the valve over its axial range of motion especially for low flow rates.

At an opposite end of the valve body 72 is a closed head portion 100 which moves reciprocally within the bushing channel 62. At an end of the closed head portion 100 is an aperture 101 for receiving the pin 74. Between the head portion 100 and the adjuster 78 is a spring 76. The pin 74 is fixed in the adjuster 78 within a pin bore 104 and is slidable into the aperture 101. The adjuster 78 is threaded into the bushing 51 and by progressing the adjuster 78 into or out of the bushing 51, the adjuster becomes an axial direction limit stop for the valve body 72. Water pressure and velocity within the valve body 72 will maintain the valve body 72 against the adjuster 78.

Flow through the inlet 20 proceeds through the open end 94 of the valve body 72 and through the orifice 96 into the annular channel 92. To adjust the flow rate, the adjuster 78 is threaded into or out of the bushing 51 which adjusts the amount of the orifice 96 which is in flow communication with the annular channel 92. After adjustment is made, the lock nut 84 can be tightened against the bushing to fix the position of the adjuster 78. The adjuster 78 is rotated to progress through the bushing 51 by a hexagonal socket 110. An allen wrench or the like is inserted into the indent 110 to adjust the valve.

The annular channel 92 opens into an intermediate channel 174 which expands into a flow channel 180. The flow channel 180 houses an orifice range control 182 which is sealed at two positions by a first O-ring 184 and a second O-ring 186. Within the control 182 is a central passage 190 which opens into a first orifice 192 having a stepped profile with a larger diameter at its radial outer most position. The first orifice 192 opens into an outlet channel 200 which is open to the outlet 48.

The control 182 is axially rotatable by the control knob 32 which extends outward of the body 20. A locking region 204 (shown in FIG. 5) is provided within the body adjacent the control knob 32 for locking rotational position of the range control 182.

Figure 3:
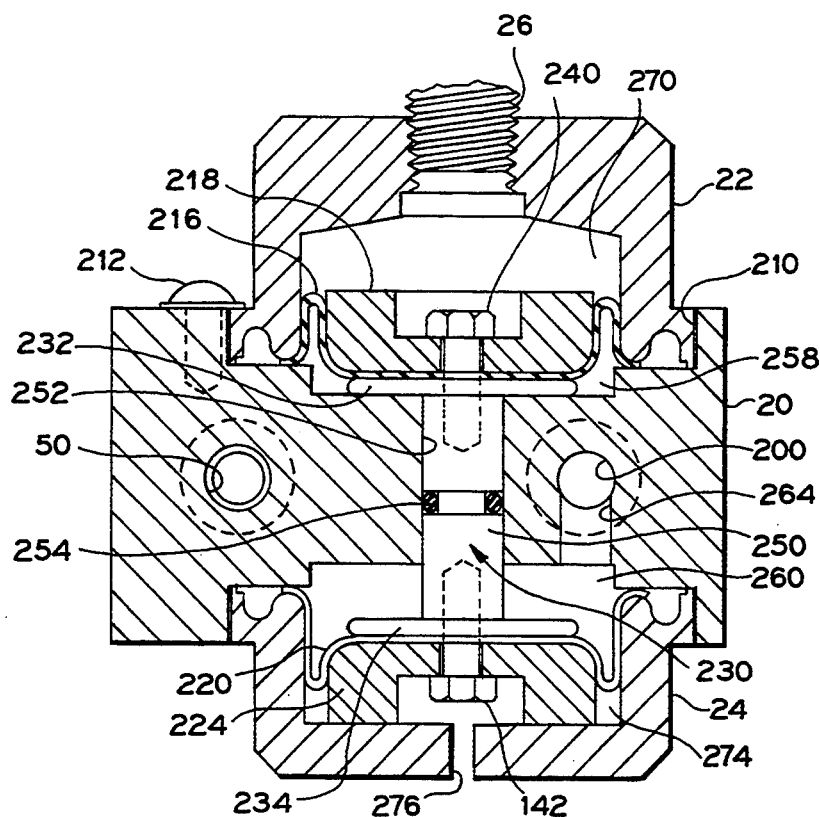
FIG. 3 is a sectional view taken generally along line III—III of FIG. 2.

FIG. 3 illustrates the body 20 mounted to the cover 22 via a recess 210 formed in the body 20. Both the cover 22 and the body recess 210 are circular. A plurality of screws 212 hold the cover 22 within the recess 210. An identical inverted configuration mounts the bottom cover 24 to the body 20. Mounts in between the top cover 22 and the body 20 is a circular diaphragm 216 upon which is mounted a first piston 218. Mounted between the bottom cover 24 and the body 20 is a second circular diaphragm 220. Mounted to the second circular diaphragm 220 is a second piston 224.

Mounted between the first diaphragm 216 and the second diaphragm 220 is a spool 230 having a top flange 232 and a bottom flange 234 which receive bolts 240, 242 for mounting together the top piston 218, the diaphragm 216, the spool 230, the bottom diaphragm 220 and the bottom piston 224 as an integral unit. The spool 230 has a central shaft 250 which reciprocates within a central bore 252 of the body 20. An O-ring seal 254 is provided around the shaft 250 for sealing to the body 20. A top chamber 258 is defined between the diaphragm 216 and the body 20 and a bottom chamber 260 is defined between the body 20 and bottom diaphragm 220.

Figure 6:
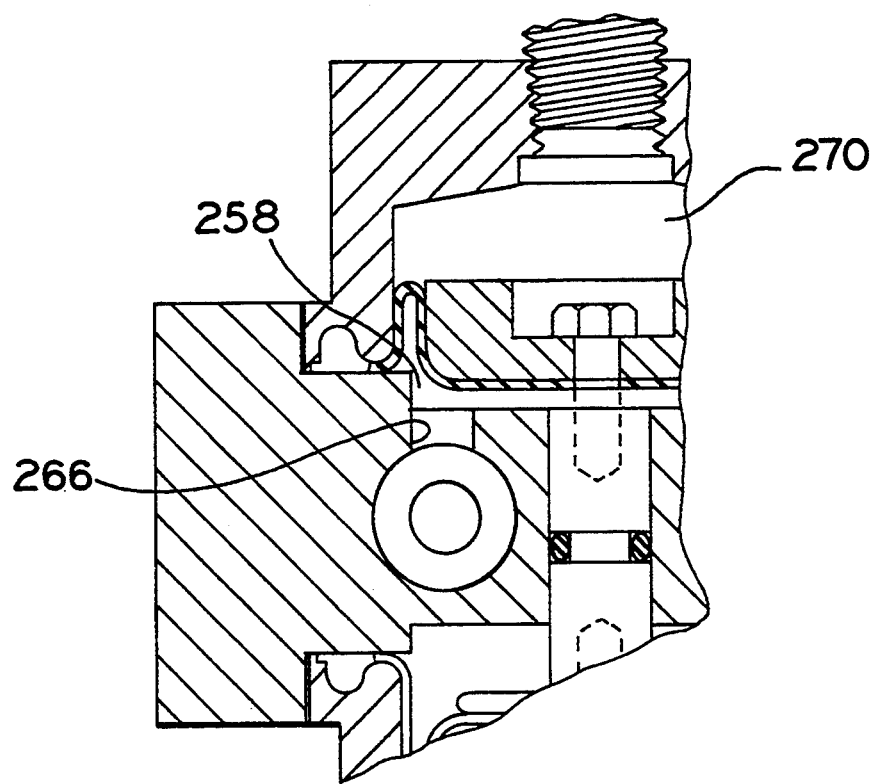
FIG. 6 is a sectional view taken generally along line VI—VI of FIG. 2.

A first pressure port 264 is provided between the flow channel 200 and the bottom chamber 260. A second pressure port 266 is provided between the flow channel 180 and the top chamber 258 as shown in FIG. 6. A third compartment 270 is defined between the top cover 22 and the diaphragm 216. As can be seen in FIG. 2, the location of the first pressure port 264 and the second pressure port 266 are such that these ports span across the orifice 192 and thus reflect a pressure difference corresponding to the pressure drop across the orifice is present at these ports.

A fourth compartment 274 formed below the diaphragm 220 is vented at a hole 276 to atmosphere. Thus, differential pressure within the top compartment 258 and the bottom compartment 260 will cause the spool 250 to rise or fall accordingly and which causes the fluid such as air within the compartment 270 to be compressed upon raising of the spool and expanded (pressure reduced) upon lowering of the spool. The pressure within the compartment 270 is monitored by the dial gauge 26 which has a calibrated scale 280 which can be read in GPH (gallons per hour) for two ranges.

Figure 4:
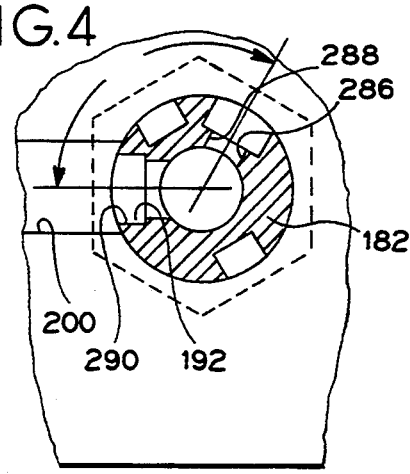
FIG. 4 is a sectional view taken generally along line IV—IV of FIG. 2.

FIG. 4 illustrates the range adjustment of the present invention. The first stepped orifice 192 is shown opening into the outlet channel 200. As can be seen in FIG. 4 upon axial rotation of the range control 182 a second orifice 286 having a reduced diameter 288 as compared to the diameter 290 of the first orifice 192, can be opened into the outlet channel 200. This smaller orifice would be used for a lower flow rate range where a higher proportional pressure drop across the orifice would be required for accurate reading of flow rate.

Figure 5:
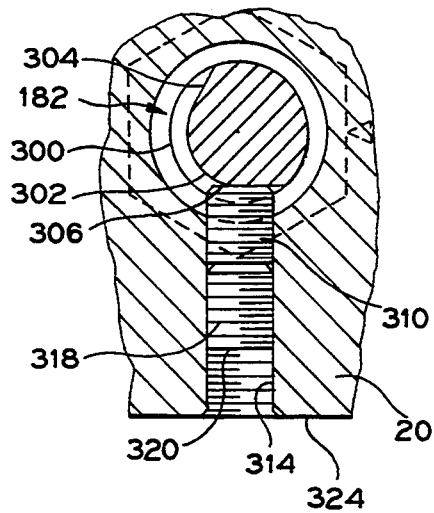
FIG. 5 is a sectional view taken generally along line V—V of FIG. 2.

FIG. 5 illustrates a feature of the invention wherein the range selected, that is, the particular orifice arranged to be in communication with the outlet channel 200, can be locked in place to prevent tampering. The range control 182 provides an annual recess 300 itself having a further recess 302 on only one side thereof which provides a first flat spot 304 and a second flat spot 306. The flat spots 304,306 correspond to a axially rotary position of the range control 182 wherein the first orifice 192 or the second orifice 286 is in proper position open into the outlet channel 200. Thus, once one of these two orifice are selected, a first set screw 310 is threaded through a bore 314 and the body 20 to abut flat spot such as the flat spot 306. A further set screw 318 is followed into the bore 314 to back up the first set screw 310, the set screws locking together to prevent loosening. The further set screw 318 has a trailing end 320 which, when installed, is recessed from an outer surface 324 of the body 20.

Figure 7:
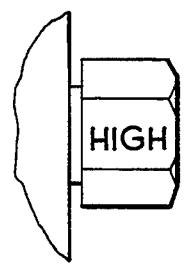
FIG. 7 is an enlarged elevational view of a range control knob as shown in FIG. 1 in a first position.
Figure 8:
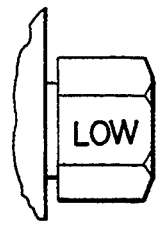
FIG. 8 is an enlarged view of the control knob of FIG. 7 in a second orientation.

FIGS. 7 and 8 show the control knob 32 set at two different range positions, "high" and "low".

Although the present invention has been described with reference to a specific embodiment, those of skill in the art will recognize that changes may be made thereto without departing from the scope and spirit of the invention as set forth in the appended claims.

We claim as our invention:

1. An apparatus for regulating flow rate, comprising:
a flow channel having an inlet and an outlet;
an adjustable control valve for providing regulated flow resistance, located at a position in said flow channel;
a selectable flow orifice assembly, located at a second position in said flow channel, said selectable flow orifice assembly having at least two flow orifices alternatively selectively positionable into said flow channel;

an upstream port and a downstream port on respective opposite sides of said orifice assembly for measuring differential pressure across said flow orifice positioned in said flow channel;

means for transforming differential pressure read at said upstream and downstream ports into a visible flow reading;

said means for transforming differential pressure comprises a double headed piston having two heads and a body;

said piston reciprocally mounted within said body, said heads of said double headed piston acted on by pressurized fluid from said upstream port and said downstream port respectively, and said doubled headed piston moves corresponding to said differential pressure;

a means for transforming movement of said double headed piston into a visible reading;

said means for transforming movement comprises a chamber defined in part by one head of said double headed piston, and movement of said double headed piston compresses a fluid or gas held within said chamber; and a pressure gauge installed for reading pressure within said chamber which corresponds to movement of said double headed piston.

2. The apparatus according to claim 1 wherein said orifice assembly comprises a tubular member sealingly fit within said flow channel having a central bore with an open end for receiving flow, and radial bores forming each of said orifices, said radial bores opening into said central bore and positionable to selectively open into said flow channel.

3. The apparatus according to claim 1 comprising a block, wherein said flow channel is formed through said block, and said control valve and said flow orifice assembly penetrate said block to register with said flow channel, each of said control valve and said flow orifice assembly having control knobs outside said block for adjustment of flow or selection or range respectively.

4. An apparatus for regulating flow rate, comprising:
a flow channel having an inlet and an outlet;
an adjustable control valve for providing regulated flow resistance, located at a position in said flow channel;
a selectable flow orifice assembly, located at a second position in said flow channel, said selectable flow orifice assembly having at least two flow orifices alternatively selectively positionable into said flow channel;
an upstream port and a downstream port on respective opposite sides of said orifice assembly for measuring differential pressure across said flow orifice positioned in said flow channel;
means for transforming differential pressure read at said upstream and downstream ports into a visible flow reading;
a block;
said flow channel is formed through said block;
said control valve and said flow orifice assembly penetrate said block to register with said flow channel, each of said control valve and said flow orifice assembly having control knobs outside said block for adjustment of flow and selection of range respectively;

a means for transforming differential pressure comprises a double headed piston having two heads and reciprocally mounted within said block, said heads of said double headed piston acted on by pressurized fluid from said upstream port and said downstream port respectively, and said double headed piston moves corresponding to said differential pressure;

a means for transforming movement of said double headed piston into a visible reading;

said means for transforming movement comprises a chamber defined in part by one head of said double headed piston, and movement of said double headed piston compresses a fluid or gas held within said chamber; and a pressure gauge installed for reading pressure within said chamber which corresponds to movement of said double headed piston.

5. The apparatus according to claim 4 wherein said orifice assembly comprises a tubular member sealingly fit within said flow channel having a central bore with an open end for receiving flow, and radial bores forming each of said orifices, said radial bores opening into said central bore and positionable to selectively open into said flow channel.

6. The apparatus according to claim 5 wherein said tubular member comprises a position locking region having a flat surface corresponding to an axial rotary orientation wherein a select orifice is open into said flow channel; and said block comprises a threaded bore from an outside to said flat side, and a set screw penetrating said threaded bore and abutting said flat side.

7. The apparatus according to claim 6 wherein said position locking region comprises a second flat side corresponding to an alternate rotary position of said tubular member opening a second orifice in said flow channel, said second flat side positionable in registry with said threaded bore to be locked thereat by said set screw.

8. An apparatus for controlling flow rate, comprising:
a block having a central aperture;
a top cover and a bottom cover arranged on opposite sides of said block closing said aperture and forming a first chamber and a second chamber respectively with said block;
a flow channel formed in said block and having an inlet and an outlet on an outside surface of said block;
a flow orifice assembly, located at a first position in said flow channel, said flow orifice assembly having at least one flow orifice positionable into said flow channel;
an upstream port and a downstream port on respective opposite sides of said orifice assembly for measuring differential pressure across said flow orifice positioned in said flow channel;
means for transforming differential pressure read at said upstream and downstream ports into a visible flow reading;
said means for transforming differential pressure comprises a double headed piston having two heads and a shaft connected at opposite ends to said two heads;
said shaft reciprocally mounted within said aperture of said block, said heads of said double headed piston arranged in said first chamber and second chamber respectively and acted on by pressurized fluid from said upstream port and said downstream port respectively, and said doubled headed piston moves corresponding to said differential pressure; said head in said first chamber forming a substantially closed and sealed gas compression chamber on a side of said head opposite said upstream port; and means for reading pressure within said compression chamber which corresponds to movement of said double headed piston.

9. The apparatus according to claim 8 further comprising an adjustable control valve for providing regulated flow resistance, located at a second position in said flow channel.

* * * * *